March 7, 1939.   D. E. ELLIS   2,149,808
EMERGENCY AUTOMATIC RADIO TRANSMITTER
Filed June 1, 1938
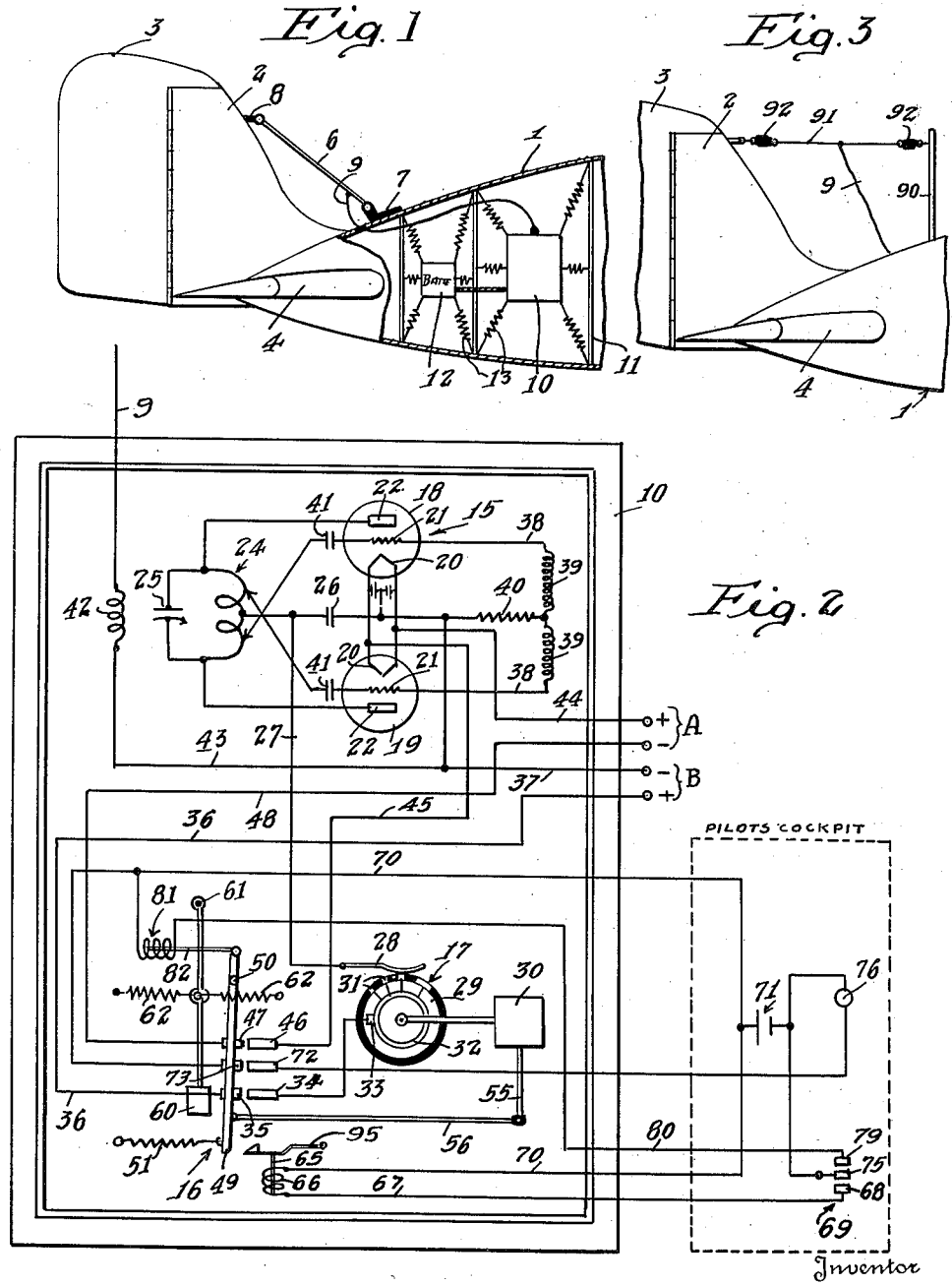
Inventor
Daniel E. Ellis Patented Mar. 7, 1939

2,149,808

UNITED STATES PATENT OFFICE 2,149,808

EMERGENCY AUTOMATIC RADIO TRANSMITTER

Daniel E. Ellis, Los Angeles, Calif.

Application June 1, 1938, Serial No. 211,143

6 Claims. (Cl. 250—17)

This invention relates to emergency radio signaling systems for aircraft and the like and has as a broad object to automatically transmit radio signals from a crashed airplane whereby its position can be located by means of radio compasses.

As is well known, airplanes all too often crash suddenly without warning so that the pilot has no opportunity to notify land stations of his position and days, weeks, or months, may elapse before the airplane is found. In fact some airplanes have never been located even after years.

In accordance with the present invention I propose to render the location of a crashed plane easy and rapid by equipping the plane with an emergency radio transmitter adapted to be energized from batteries and automatically set into operation in response to the shock of a crash. The details of the invention are such as to reduce the likelihood of the apparatus being disabled by the crash.

A full understanding of the invention may be had from the following detailed description of a specific embodiment thereof, it being understood that various modifications in the particular construction described may be made without departing from the invention.

In the drawing:

Fig. 1 is a side elevation view, partly in section, of the tail portion of an airplane equipped with a transmitter in accordance with the invention;

Fig. 2 is a schematic diagram illustrating the circuits and apparatus employed in the installation shown in Figure 1; and Fig. 3 is a partial side elevation view of the tail portion of an airplane similar to Figure 1 but showing a different antenna structure.

Referring first to Figure 1, there is shown the rear or tail portion 1 of the fuselage of an airplane, together with the vertical stabilizer 2, rudder 3, and one horizontal stabilizer fin 4.

In accordance with the present invention, I mount a short antenna 6 at the angle defined between the upper surface of the rear end of the fuselage 1 and the front edge of the vertical stabilizer 2. The antenna 6 is preferably a relatively rigid structure supported at its forward end by an insulating member 7 from the fuselage 1 and supported at its rear end by an insulating member 8 from the vertical stabilizer 2. The antenna is connected adjacent its forward end to a shielded lead-in cable 9 which is extended to the radio transmitter 10 mounted within the fuselage 1 and next to be described.

In accordance with the usual practice, the fuselage 1 is segregated into a plurality of longitudinally spaced compartments separated by frame trusses 11 used to reinforce and strengthen the fuselage. I prefer to mount the transmitter 10 in one of these compartments and a battery case 12 in another adjacent compartment, although in some instances it may be desirable to assemble the transmitter and batteries in a single case.

It is essential, of course, that the transmitter and the batteries be so constructed and supported as to withstand the shocks incident to a crash. One method of support is shown schematically in Figure 1, in which the transmitter case 10 and the battery case 12 are suspended within compartments in the fuselage by a plurality of tension springs 13 which extend from the cases 10 and 12 respectively in a plurality of directions to spaced points of anchorage on the fuselage. Obviously, however, other methods of support may be employed. For instance, the cases 10 and 12 might be inclosed within thick layers of soft resilient material, such as sponge rubber. It may also be desirable to inclose the transmitter case 10 and the battery case 12 in a thick layer of some heat resistant and heat insulating material, such as asbestos, to make possible its operation even in the event of fire following a crash.

Referring now to Figure 2, the apparatus within the transmitter case 10 will be described. It consists of a tube transmitter 15, a shock responsive switch 16, and an automatic code keying device 17, as its essential elements.

Any known form of radio transmitter may be employed but it is desirable to use a simple and reliable circuit. The transmitter illustrated at 15 employs a pair of tubes 18 and 19 connected in a push-pull arrangement, each tube having a cathode 20, control grid 21, and anode 22. The two anodes 19 are connected to opposite ends of a closed oscillatory circuit, including an inductance 24 and a condenser 25 connected in parallel. A midtap on the inductance 24 is connected through a by-pass condenser 26 to the cathodes 20 of the tubes and anode potential is supplied to the anodes of the two tubes through the midtap connection on inductance 24 through a lead 27 extending to a brush 28 bearing on a code commutator 29 which is adapted to be rotated by a clock mechanism 30. The commutator 29 comprises a plurality of spaced conductive segments 31 all connected to a slip ring 32 which in turn is connected by a brush 33 to one contact 34 of the switch 16. When the switch 16 is in closed position, contact 24 is connected to a contact 35, which in turn is connected by lead 36 to the positive terminal of the B battery, it being understood that this battery is contained within the battery case 12. The negative terminal of the B battery is connected by a lead 37 to the cathodes 20 of the tubes. The rotation of the commutator 29 successively energizes the transmitter at predetermined intervals to send a predetermined code signal.

The average potential of the grids 21 is maintained at a desired value with respect to the cathodes 20 by connecting each grid through a separate lead 38 and a separate choke coil 39 and through a common grid resistor 40 to the cathodes. The grids 21 are energized by connecting each one through a condenser 41 to oppositely disposed points on the inductance 24 in the tuning circuit. The radio frequency currents generated in the tuned circuit are transmitted to the antenna lead-in 9 by an inductance element 42 which is magnetically coupled to the tuning inductance 24. The antenna circuit is grounded to the cathodes of the tubes by a lead 43.

The cathodes 20 of the tubes are energized from an A battery which will be contained with the B battery in the battery case 12, thus one side of the cathode circuit may be permanently directly connected by a lead 44 to one terminal of the A battery and the other side of the cathode circuit is connected by lead 45 through switch contacts 46 and 47 on switch 16 and through a lead 48 to the other terminal of the A battery. It will be observed that both the A and B supply circuits are normally open so that there is no drain on these batteries except when the shock responsive switch 16 is closed to transmit a signal.

The battery leads from the transmitter case 10 to the battery case 12 are preferably contained in a strong cable insulated with asbestos or other heat resistant material so that it will not readily be incapacitated by fire.

The switch 16, in addition to the contacts described, comprises a bar 49 which supports the contacts 35 and 47 and is mounted for swinging movement on a pivot 50. The bar 49 is normally maintained in position to hold the contacts open by a tension spring 51.

The clock mechanism 30 is preferably of the spring type adapted to run for a long period of time to rotate the commutator 29 for a period of several days. In fact it should be adapted to function for a period of time at least equivalent to the expected life of the batteries when in service. The mechanism 30 is normally rendered inoperative but is adapted to be started into action at any time by movement of a starting arm 55 and this starting arm 55 is connected by a link 56 to the switch arm 49 so that movement of the switch arm to close the switch contacts simultaneously moves the clock control arm 55 to start the clock mechanism in operation.

To actuate the switch 16 in response to a crash a pendulum 60 is provided which is pivotally supported at its upper end for swinging movement by a pivot 61 and is normally retained in vertical position by damping springs 62, which restrain it against any substantial movement in response to unavoidable shocks incident to flying and landing of an airplane. However, in response to a violent shock such as occasioned by the crash of the plane, the pendulum 60 will swing forward with substantial force to strike the switch bar 49 and move it into position to close the switch contacts thereon with the stationary contacts and actuate the clock mechanism control arm 55 into position to start the clock mechanism. When so actuated, the switch arm 49 will normally be retained in closed position by a spring latch 95.

If the pendulum 60 is made sufficiently sensitive, as by proportioning the damping springs 62, to insure that it will always respond to close the switch 16 in event of a crash, it is possible that it may occasionally function to close the switch 16 in response to some unusual shock in normal operation of the airplane. Hence I prefer to provide an indicating means that will indicate to the pilot if the switch 16 has been accidentally closed and a release mechanism permitting the pilot to release the latch 95 and thereby permit opening of the switch 16 by the spring 51. To this end the latch 95 is provided with a core 65 cooperating with the solenoid 66 which is connected by leads 67 to one contact 68 of a switch 69 in the cockpit of the airplane and by a lead 70 to one terminal of a battery 71, the other terminal of which is connected to a movable contact 75 on switch 69. The cockpit is also equipped with a pilot light 76 which is connected between one terminal of the battery 71 and a stationary contact 72 on switch 16, which cooperates with a moving contact 73 on the switch, which moving contact is connected to an extension of lead 70 connected to the other terminal of the battery 71.

In case the switch 16 is accidentally closed by a shock in normal flight, closure of the contacts 72 and 73 thereon completes an energizing circuit for the pilot light 76 thereby immediately apprising the pilot of the closure of the switch. He thereupon actuates the switch 69 to close contact 75 on contact 68 thereon, thereby completing an energizing circuit from the battery 71 to the solenoid 66 causing the solenoid to attract the core 65 and release the latch 95, whereupon the spring 51 restores the switch 16 to normal position.

It may also be desirable, on rare occasions, for the pilot to energize the transmitter in an emergency as, for instance, when he sees an impending crash or forced landing. To this end I provide an additional contact 79 on the switch 69, which contact is connected by a lead 80 through a solenoid 81 to the lead 70 connected to one terminal of the battery 71. Cooperating with the solenoid 81 is a plunger 82 which is pivotally connected to the upper end of the switch arm 49 above the pivot point 50. Closure of the contact 75 on the contact 79 of switch 69 in the pilot's cockpit completes a circuit from the battery 71 to the solenoid 81, energizing the latter and causing it to attract its core 82 and thereby move the switch arm 49 into closed position, in which position it is latched by the latch 95. Of course, should the pilot later desire to stop the transmitter, he can do so by actuating switch 69 to close contact 75 on contact 68, as previously described.

Although the specific details of the apparatus employed may be readily determined by any radio technician, it will probably usually be desirable to employ a relatively short wave length transmitter, probably using a wave length between five and ten meters. This permits the use of a relatively small antenna which may be of such length as to be naturally tuned at the wave length employed and in some installations at least it may be possible to position the antenna at such a distance from the airplane structure as to utilize reflection of the waves from the plane structure to increase the intensity of the signal transmitted. Tubes of the type having filaments adapted to be energized from a two volt battery, with very low current drain, are preferable since they reduce the size and weight of the A battery required. The B battery can be of the ordinary dry cell type.

The antenna structure heretofore described with reference to Figure 1 is particularly desirable because it involves no objectionable projecting parts on the fuselage and the antenna itself is well protected from damage during a crash by its position within the angle formed between the fuselage and the vertical stabilizer fin.

However, in some instances other types of antenna may be employed to obtain greater efficiency of transmission. One such alternative arrangement is disclosed in Figure 3, in which a vertical post 90 is provided projecting upwardly from the fuselage in advance of the vertical stabilizer fin 2 and an antenna wire 91 is supported by suitable insulators 92 in taut relation between the upper end of the stabilizer fin 2 and the post 90. This construction may enable the use of a longer antenna on some airplanes than the construction shown in Figure 1. It may also make possible in some instances the positioning of the antenna one-quarter wave length from the fuselage of the airplane whereby reflection of waves from the fuselage may be utilized to increase the strength of the signal transmitted.

It is particularly advantageous to position the apparatus in the tail of the airplane as described because experience has proved that the rear tail portion is the safest place for such apparatus in event of a crash. In many crashes the tail portion of the fuselage is completely broken away from the cabin but remains substantially intact and in normal position whereas the cabin portion may be completely demolished. It is also true that in many crashes the tail is broken away and thereby saved from destruction by fire which consumes the forward part of the ship.

Fortunately the space utilized in the tail of the ship for the mounting of my apparatus is ordinarily not employed for other purposes so that the installation does not interfere in any way with the normal design or usage of the airplane.

For purposes of explaining the invention a particular embodiment thereof has been described in detail. It is to be understood, however, that many changes can be made from the particular construction described and without departing from the invention and the latter is to be limited only as set forth in the appended claims.

I claim:

1. In combination with an aircraft having a tail portion, radio transmitting means and means responsive to sudden stoppage of the aircraft for rendering said transmitting means operative; each of said means being located in said tail portion of said aircraft.

2. In combination with an aircraft having a tail portion, radio transmitting means, current supply means for energizing said transmitting means, and switch means responsive to sudden stoppage of the aircraft for connecting said current supply means to said transmitting means, said transmitting and current supply means being located in the tail portion of the aircraft.

3. In a radio system for an aircraft having a tail portion with a stabilizing means associated with the tail portion and carrying a radio transmitting means for sending a signal in response to sudden stoppage of the aircraft; the transmitting antenna construction comprising an antenna positioned in the angle between said stabilizing means and said tail portion.

4. In combination with an aircraft, radio transmitting means thereon adapted when energized to automatically transmit a radio signal, current supply means for energizing said transmitting means, and switch means responsive to sudden stoppage of the aircraft for connecting said current supply means to said radio transmitting means whereby it is energized to transmit a radio signal, said switch means comprising a stationary switch member and a movable switch member, said members having cooperating contacts thereon adapted to be closed by closing movement of said movable member, means for normally retaining said movable member in open position, means for latching said movable member in closed position in response to initial closure thereof, shock responsive means for closing said switch, electrically actuated means for releasing said latching means, and means including a manually operated switch for selectively energizing said electrically actuated means.

5. The combination as described in claim 3, in which said antenna member is supported at one end on said stabilizer and at the other end on the tail portion of said aircraft.

6. In combination with an aircraft having a tail portion and also having a pilot's compartment; a radio transmitting means and means for energizing it both mounted in said tail portion, means responsive to sudden stoppage of the aircraft for connecting said energizing means to said transmitter, said means responsive to stoppage including an impact operated switch, means for normally retaining said switch in open position, means for latching said switch in closed position in response to initial closure thereof, and electrically actuated remote control means for manually releasing said impact actuated switch from the pilot's compartment.

DANIEL E. ELLIS.